(12) United States Patent
Calire

(10) Patent No.: US 6,839,891 B1
(45) Date of Patent: Jan. 4, 2005

(54) METHOD AND APPARATUS FOR A WEB-RELATED STATE MACHINE

(75) Inventor: Dyami Calire, Encinitas, CA (US)

(73) Assignee: Kinzan.com, Carlsbad, CA (US)

( * ) Notice: Subject to any disclaimer, the term of this patent is extended or adjusted under 35 U.S.C. 154(b) by 0 days.

(21) Appl. No.: 09/557,749

(22) Filed: Apr. 25, 2000

(51) Int. Cl.⁷ .............................................. G06F 9/44
(52) U.S. Cl. ...................................... 717/100; 717/127
(58) Field of Search ........................ 717/100, 114–119, 717/127

(56) References Cited

U.S. PATENT DOCUMENTS

| | | | |
|---|---|---|---|
| 6,035,119 A | | 3/2000 | Massena et al. |
| 6,101,510 A | | 8/2000 | Stone et al. |
| 6,145,120 A | * | 11/2000 | Highland .................... 717/106 |
| 6,430,739 B1 | * | 8/2002 | Ballard ....................... 717/100 |
| 6,574,790 B1 | * | 6/2003 | Abramson et al. .......... 717/100 |

OTHER PUBLICATIONS

Hirsch. Exercise the Power of the World Wide Web. IEEE. 1995. pp. 25–29.*
Fraternali et al. Tools and Approaches for Developing Data–Intensive Web Applications: A Survey. ACM. 1999.227–263.*
Goschka et al. Using Finite State Machines as Design and Engineering Model for Database Backed Web Application. IEEE. 2000. pp. 1–10.*

* cited by examiner

*Primary Examiner*—Wei Y. Zhen
(74) *Attorney, Agent, or Firm*—Blakely, Sokoloff, Taylor & Zafman LLP

(57) ABSTRACT

The invention provides a method and apparatus for a web-related state machine. In one embodiment, the method may include coordination of action states and display states through use of a state machine servlet. The method may further include maintenance of an environment for the action states and display states through use of the state machine servlet.

10 Claims, 5 Drawing Sheets

US 6,839,891 B1

METHOD AND APPARATUS FOR A WEB-RELATED STATE MACHINE

FIELD OF THE INVENTION

The invention relates generally to world wide web sites. More particularly, the invention relates to execution, presentation and development of web sites.

DESCRIPTION OF RELATED ART

With the present popularity of the world wide web, having a web presence is rapidly becoming vital to business success. However, designing web pages can be a very tedious task, and is likewise often a time-consuming and labor-intensive task. Moreover, as with other forms of software development, web sites are prone to design and execution errors or bugs.

When a web site is designed and created, much of the software incorporated into the web site is identical to software in other web sites. As a result, reusability of code is valuable to web site designers, and modular design of web sites is similarly useful. Additionally, the relationships between code objects such as objects, procedures and functions, or data can often be replicated from one web site to the next. However, it is not uncommon for the owner of one web site to want a slightly different site from other sites, such that a web site may not be wholly duplicated. In particular, the sequence of operations required to accomplish an act may vary between web sites, even though each operation of the sequence may be common to many web sites.

These variations result in errors when code is taken from a first web site design and incorporated into a second web site design. As most programmers and developers may recognize, the complexity of code for web sites may attain a level such that only exceptional attention to detail will eliminate all design errors or bugs.

Moreover, web sites are used by and interact with humans, many of whom behave in a manner considered unpredictable by developers of web sites. Additionally, the technology used to access the world wide web and interact with web sites is not always reliable enough to ensure that the interaction occurs smoothly. Thus, as an example, a user may place an order to purchase stock on a stock exchange through an online broker. Due to transmission difficulties or for any number of other reasons, the user may not receive confirmation that the order was received, and believe the order was not entered. If the user still has the order placement web page displayed, the user may attempt to place the order again. This may result in two orders being placed when the user only sought to place one order.

It will thus be appreciated that reducing errors due to connection difficulties, errors due to unpredictable user behavior and errors due to design bugs may be beneficial.

SUMMARY OF THE INVENTION

The invention provides a method and apparatus for a web-related state machine. In one embodiment, the method may include coordination of action states and display states through use of a state machine servlet. The method may further include maintenance of an environment for the action states and display states through use of the state machine servlet.

Other features and advantages of the present invention will be apparent from the accompanying drawings and from the detailed description that follows below.

BRIEF DESCRIPTION OF THE DRAWINGS

The accompanying drawings, which are included as part of the present specification, illustrate embodiments of the present invention and together with the general description given above and the detailed description given below serve to explain and teach the principles of the present invention.

DETAILED DESCRIPTION

Figure 1:
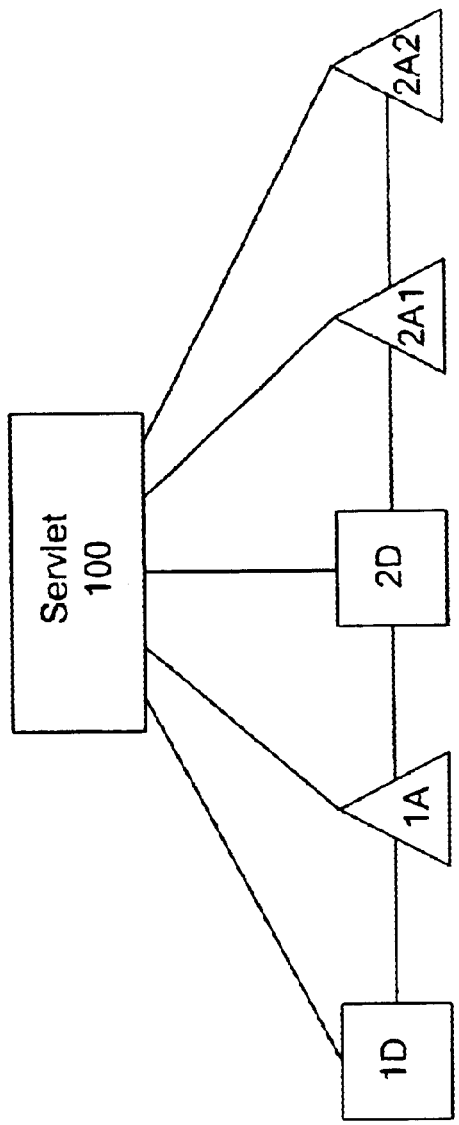
FIG. 1 illustrates an embodiment of a state machine and corresponding states.

A method and apparatus for a web-related state machine is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

An apparatus for performing the operations herein may also lay within the spirit and scope of the present invention. This apparatus may be specially constructed for the required purposes, or it may comprise a processor selectively activated or reconfigured by execution of a set of instructions. Such a set of instructions may be embodied in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, carrier waves, or any type of media suitable for storing electronic instructions.

The algorithms and displays presented herein are not inherently related to any particular computer or other apparatus. Various general purpose systems may be used with sets of instructions in accordance with the teachings herein, or it may prove convenient to construct more specialized apparatus to perform the required method. The required structure for a variety of these systems will be apparent. In addition, the present invention is not described with reference to any particular programming language. It will be appreciated that a variety of programming languages may be used to implement the teachings of the invention as described herein.

A state machine may be provided to manage execution and display of a web site. The state machine may oversee execution of display states and action states and may also maintain an environment in which the states may be executed. The code or objects used to implement each state may then interact with the state machine and the environment. Thus, the code or objects may be simpler and may be reused to implement a variety of web sites. Moreover, a history of a user's interaction with a web site may be maintained.

Providing a state machine to manage execution and display of a web site may help to eliminate errors. It may be used to effectively control reused code, ensuring that the various portions of code or objects interact properly even though they are used in different configurations. It may also be used to track execution and interaction with users, thus avoiding errors resulting from unpredictable user behavior or transmission difficulties.

FIG. 1 illustrates an embodiment of a state machine and corresponding states. Servlet 100 implements the state machine, and may be an object or a procedure or other set of code suitable for execution by a processor. In one embodiment, servlet 100 accesses a table of states which contains information about what code or objects implement each state and what the next state should be after each state is executed. Thus, servlet 100 may access the table of states and then cause execution of the appropriate code or activity by the appropriate object to occur.

State 1D is a display state. Display states involve display of a web page, and may be implemented as HTML code in one embodiment. A display state may result in an action taken by a user. State 1A is an action state. Action states involve some form of internal action or execution by the machine used to execute the web site in one embodiment. Similarly, state 2D is a display state, and states 2A1 and 2A2 are action states.

In one embodiment, state 1D displays a login screen to which a user submits a user identification (userid) and a password. The servlet 100 maintains the userid and the password in the environment, and passes execution on to state 1A. In state 1A, the userid and password are validated, a determination is made as to whether they are valid and as to whether they match each other. The servlet 100 then passes execution to state 2D, a list of products is displayed and an order may be accepted.

Next, the servlet 100 passes execution to state 2A1, order information as submitted by a user in state 2D is extracted from the environment and a determination is made as to whether the order may be filled. This determination may include actions such as checking for availability of a product, whether the user is permitted to order the product, and any other details that may be appropriate. Then the servlet 100 passes execution to state 2A2, the order is generated, with appropriate shipping information from the user (such as information in a stored profile) along with the actual order information such as product identification, quantity, price, and other relevant information.

Figure 2B:
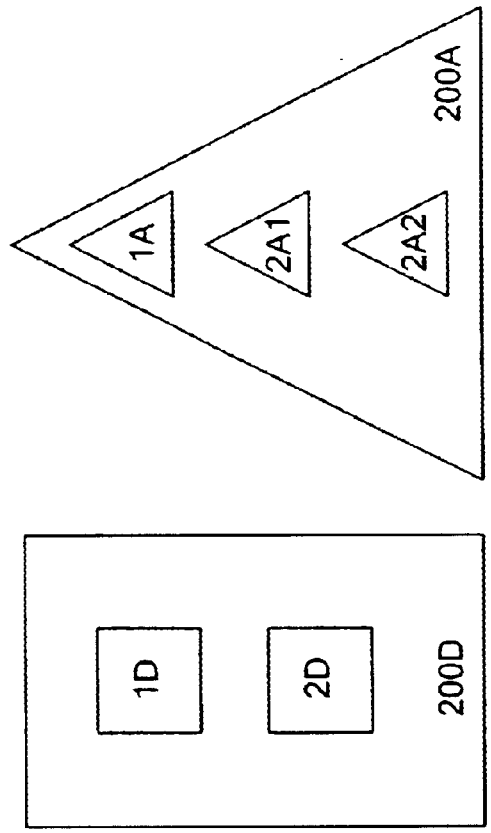
FIG. 2B illustrates components of the states illustrated in FIG. 2A.
Figure 2A:
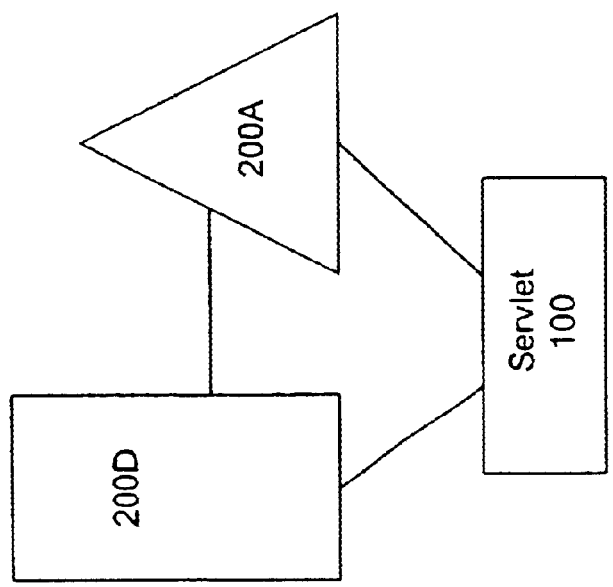
FIG. 2A illustrates an alternate embodiment of a state machine and corresponding states.

FIG. 2A illustrates an alternate embodiment of a state machine and corresponding states. In this embodiment, servlet 100 accesses a table which contains only two states, state 200D (a display state) and state 200A, an action state. FIG. 2B illustrates components of the states illustrated in FIG. 2A. As will be apparent, both the display portions of state 1D and state 2D are incorporated into state 200D. Similarly, the action portions of states 1A, 2A1 and 2A2 are incorporated into state 200A.

Thus, in one embodiment, both the login information and product order information are displayed as part of state 200D, and both login information and order information may be accepted in state 200D. Then, the servlet 100 passes execution to state 200A, where the login validation, order availability determination, and order generation occur. It will be appreciated that the actions may occur in serial or parallel fashion, provided that the order generation does not complete successfully unless both the order availability determination and login validation complete successfully. Furthermore, it will be appreciated that the states of FIGS. 1 and 2 may only represent a subset of the necessary states for implementing a full web site of linked web pages.

One may refer to a set of associated states as a wizard, and the wizard may be expected to suitable for accomplishing some task associated with the web site. Thus, states 2D, 2A1 and 2A2 of FIG. 1 may be a wizard which in one embodiment may be used to receive and generate an order. Similarly, one may refer to a set of wizards as a domain, and a complete domain may be suitable for implementation of an entire web site or a portion of a web site. In some embodiments, each wizard may have a separate state table, while the domain has a state table with references to each wizard. Alternatively, a domain may have a single state table with references to each state in the domain, and with wizards defined as portions of the domain.

Figure 3:
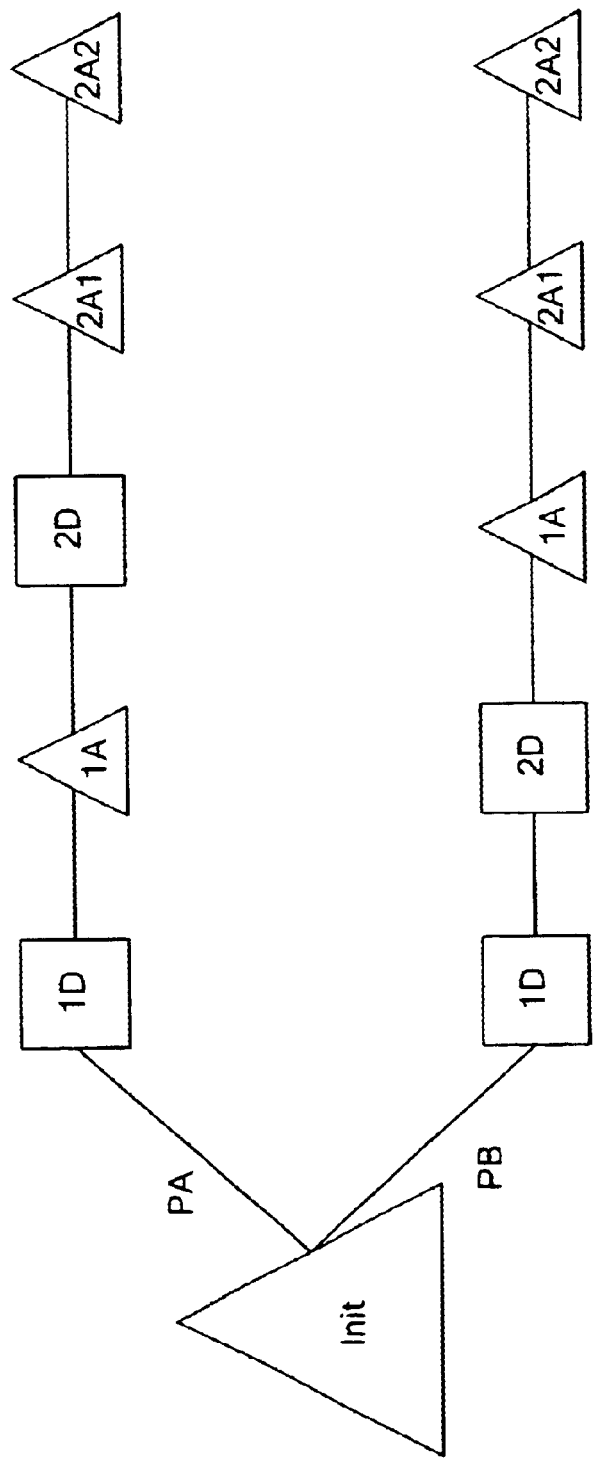
FIG. 3 illustrates another alternate embodiment of a state machine and corresponding states.

FIG. 3 illustrates another alternate embodiment of a state machine and corresponding states. In this embodiment, the init state makes a determination of whether path PA or path PB is suitable for execution. This determination may, for example, be based on how the web site is being accessed (fast or slow connection for example) or on where (what URL) the user was at prior to accessing the web site. Should path PA be chosen, the slates will be executed in a first order. Should path PB be chosen, the states will be executed in a second order. It will be appreciated that the states following paths PA and PB need not be identical, and that the linkages may be arbitrarily complex. However, it will be similarly appreciated that the servlet may be expected to control execution of the states regardless of which path is chosen.

Figure 4:
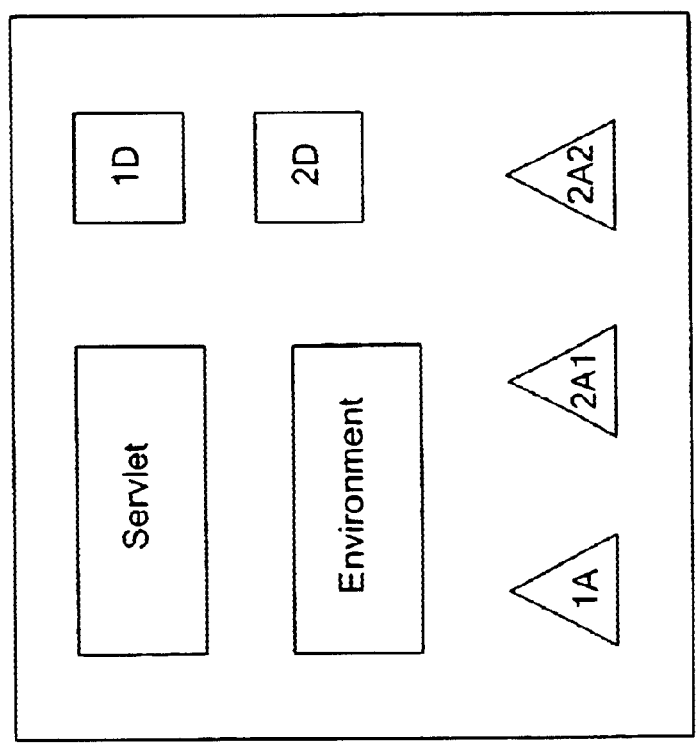
FIG. 4 illustrates a medium embodying instructions and data suitable for use as a state machine and corresponding states.

FIG. 4 illustrates a medium embodying instructions and data suitable for use as a state machine and corresponding states. It will be appreciated that the information stored in the medium may vary depending on what is suitable for the particular medium. For example, the environment data may not be suitable for storage in read-only memory or other media which is not suitable for the rapid changes that may be expected in the environment data. Similarly, random access memory used by a processor to store the instructions may only store some portion of the instructions at any one time. All the same, the components used to execute a web site may be stored in the media separately or together. A processor may then access these components as necessary to execute the web site.

Figure 5:
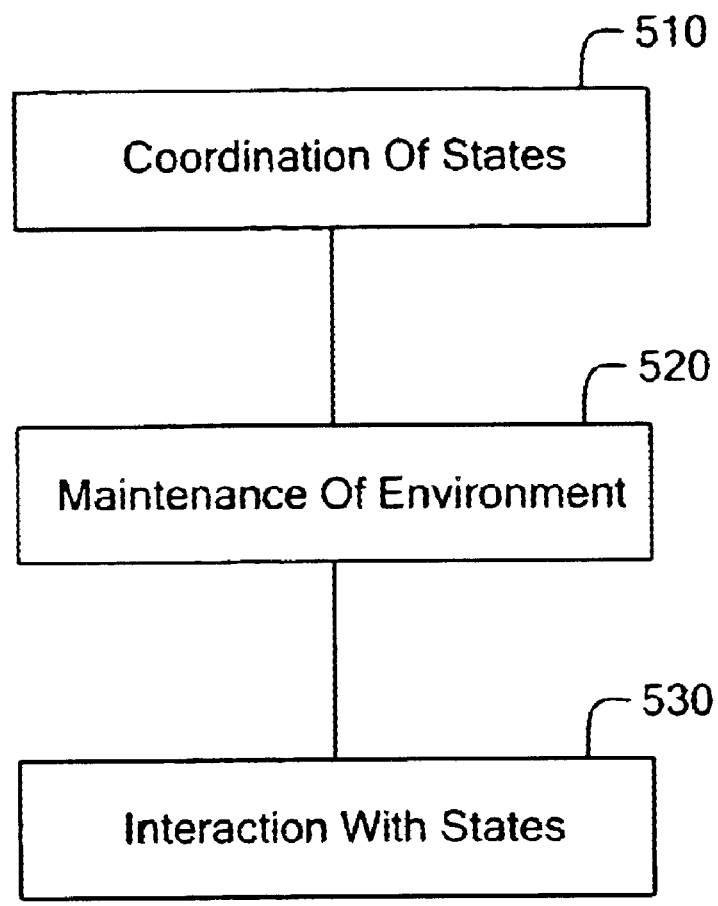
FIG. 5 illustrates one embodiment of a process of executing a state

FIG. 5 illustrates one embodiment of a process of executing a state machine. At block 510, the states are coordinated, such that execution of the applicable code or action by the applicable objects occurs in a proper manner for each state and the transition from one state to the next occurs properly. At block 520, the environment is maintained. This includes creating, managing and deleting instances of objects or other data and in particular may include managing any data which the various states may need access to. At block 530, the states interact with the state machine and the environment. This may include passing messages from state objects to environment objects, modifying environment data, or communicating a success or failure result from a state to the state machine. It will be appreciated that the blocks of FIG. 5 represent portions of a process or method which may occur either in parallel or in serial fashion in a multitasked or single-task environment. Furthermore, it will be appreciated that implementation of these portions of the process may occur in a variety of ways within the spirit and scope of the invention. In particular, the state machine and state code may be written in C or may be implemented as C++ objects, thus resulting in different communication methodologies and execution patterns without departing from the spirit of the invention.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 4 may be integrated into components, or may be subdivided into components. Moreover, the blocks of FIG. 5 represent portions of a method which, in some embodiments, may be reordered or may be organized in parallel rather than in a linear or step-wise fashion. The present specification and figures are accordingly to be regarded as illustrative rather than restrictive.

What is claimed is:

1. A method of operating a web site, comprising:

coordinating states of a web site, the states including code which effects the display and actions of the web site and at least one wizard operable to receive orders and to generate orders, wherein the display includes a user login screen;

receiving a user ID and a password from a user;

passing execution to an action state after receiving the user ID and the password;

maintaining a history of user interaction with the web site; and maintaining an environment of the web site, the code of the states having access to the environment, wherein maintaining the environment includes maintaining the user ID and the password in the environment.

2. The method of claim 1, wherein:

the coordinating and maintaining are performed by a state machine; and the state machine interacting with the states.

3. The method of claim 2, wherein:

maintaining the environment includes creating and managing environment data.

4. The method of claim 2, wherein:

interacting with the states includes receiving indications of success or failure from the states, supplying environment data to the states and receiving changes to environment data from the states.

5. A system for operating a web site with a state machine, comprising:

means for coordinating states of a web site, the states including code which effects the display and actions of the web site and at least one wizard operable to receive orders and to generate orders, wherein the display includes a user login screen;

means for receiving a user ID and a password from a user;

means for passing execution to an action state after receiving the user ID and the password;

means for maintaining a history of user interaction with the web site; and means for maintaining an environment of the web site, the code of the states having access to the environment, wherein the means for maintaining the environment includes means for maintaining the user ID and the password in the environment.

6. The system of claim 5, further comprising:

means for interacting with the states.

7. A machine-readable medium embodying a plurality of instructions, the plurality of instructions when executed by a processor, causing the processor to perform the method comprising:

coordinating states of a web site, the states including code which effects the display and actions of the web site and at least one wizard operable to receive orders and to generate orders, wherein the display includes a user login screen;

receiving a user ID and a password from a user:

passing execution to an action state after receiving the user ID and the password;

maintaining a history of user interaction with the web site; and maintaining an environment of the web site, the code of the states having access to the environment, wherein maintaining the environment includes maintaining the user ID and the password in the environment.

8. The machine-readable medium of claim 7 embodying additional instructions, the additional instructions when executed by a processor, causing the processor to perform the method wherein:

the coordinating and maintaining are performed by a state machine; and the state machine interacting with the states.

9. The machine-readable medium of claim 8 embodying additional instructions, the additional instructions when executed by a processor, causing the processor to perform the method wherein:

maintaining the environment includes creating and managing environment data.

10. The machine-readable medium of claim 8 embodying additional instructions, the additional instructions when executed by a processor, causing the processor to perform the method wherein:

interacting with the states includes receiving indications of success or failure from the states, supplying environment data to the states and receiving changes to environment data from the states.

* * * * *